US006569952B1

(12) United States Patent
Chen et al.

(10) Patent No.: US 6,569,952 B1
(45) Date of Patent: May 27, 2003

(54) ENHANCED PHOTOPHYSICS OF CONJUGATED POLYMERS

(75) Inventors: Liaohai Chen, Argonne, IL (US); Su Xu, Santa Clara, CA (US); Duncan McBranch, Santa Fe, NM (US); David Whitten, Santa Fe, NM (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/947,192

(22) Filed: Sep. 5, 2001

(51) Int. Cl.[7] .................................................. C08F 8/30
(52) U.S. Cl. ................. 525/327.1; 525/328.1; 525/332.8; 525/332.9; 525/333.1; 525/333.2; 525/359.3
(58) Field of Search ........................... 525/332.8, 332.9, 525/333.1, 333.2, 328.1, 327.1

(56) References Cited

U.S. PATENT DOCUMENTS

| | | | | |
|---|---|---|---|---|
| 5,427,915 A | * | 6/1995 | Ribi et al. ................ | 422/82.05 |
| 5,965,281 A | | 10/1999 | Cao .......................... | 428/690 |
| 6,024,923 A | | 2/2000 | Melendez et al. ........ | 422/82.08 |

OTHER PUBLICATIONS

Chen, Liaohai, et al., "Surfactant–induced modification of quenching of conjugated polymer fluorescence by electron acceptors: applications for chemical sensing." Chemical Physical Letters 330 (2000) 27–33.

* cited by examiner

Primary Examiner—Bernard Lipman
(74) Attorney, Agent, or Firm—Madson & Metcalf (57) ABSTRACT

The addition of oppositely charged surfactant to fluorescent ionic conjugated polymer forms a polymer-surfactant complex that exhibits at least one improved photophysical property. The conjugated polymer is a fluorescent ionic polymer that typically has at least one ionic side chain or moiety that interacts with the specific surfactant selected. The photophysical property improvements may include increased fluorescence quantum efficiency, wavelength-independent emission and absorption spectra, and more stable fluorescence decay kinetics. The complexation typically occurs in a solution of a polar solvent in which the polymer and surfactant are soluble, but it may also occur in a mixture of solvents. The solution is commonly prepared with a surfactant molecule:monomer repeat unit of polymer ratio ranging from about 1:100 to about 1:1. A polymer-surfactant complex precipitate is formed as the ratio approaches 1:1. This precipitate is recoverable and usable in many forms.

36 Claims, 5 Drawing Sheets

Figure 5 ized to have improved photophysical properties. Existing and newly discovered polymers with desired physical properties were rarely adapted for use in fluorescent or luminescent devices because the necessary synthesis steps often resulted in entirely different polymers that lacked either the desired physical or photophysical properties.

ENHANCED PHOTOPHYSICS OF CONJUGATED POLYMERS

GOVERNMENT RIGHTS

This invention was made with Government support under Contract Number W-7405-ENG-36 awarded by the United States Department of Energy to The Regents of the University of California. The Government has certain rights in the invention.

BACKGROUND

1. Field of the Invention

The present invention relates generally to ionic conjugated polymers. More specifically, the present invention applies to fluorescent ionic conjugated polymers complexed with oppositely charged surfactants to form a polymer-surfactant complex characterized by enhanced photophysical properties and to methods of producing the same.

2. Description of Related Art

Polymers enjoy an expanding range of applications. Conjugated polymers have been widely recognized for their potential as inexpensive and versatile electronic materials for many applications. Because of their wide-ranging applicability, major efforts have been focused on determining the relationship between the polymer chemical structure and conformation and the corresponding physical and chemical properties of polymer materials. Common efforts have focused on altering polymer properties by modifying the polymer conformation through changes in the polymer/monomer design and through synthesis steps that change the conjugated repeat units of the polymer.

For example, the fluorescence emission wavelength may be tuned over the entire visible range to obtain variable-color LEDs by varying polymer substituent groups to tune the $\pi$-electron density. The fluorescence can be further tuned over an additional 100 nm by varying the repeat unit to construct polymers with varying degrees of rigidity. These methods also affect the conductivity and quantum efficiency of fluorescent polymers. One of the most challenging aspects of these prior art methods is that a polymer's properties are altered by changing the repeat unit conformation of that polymer. This means that a new polymer must be synthesized for each desired variation of the polymer's electronic or photophysical properties.

For example, polymers with desired physical properties often lacked desired photophysical properties, and the desired physical properties were often lost when a new polymer was synthesized to have improved photophysical properties. Existing and newly discovered polymers with desired physical properties were rarely adapted for use in fluorescent or luminescent devices because the necessary synthesis steps often resulted in entirely different polymers that lacked either the desired physical or photophysical properties.

From the foregoing, a person having ordinary skill in the art will appreciate that there is a need in the art for ionic conjugated polymers in which the fluorescence and photophysics may be easily altered or enhanced without formidable synthesis steps. It would be a further advancement to provide a fluorescent conjugated polymer complex that exhibits enhanced photophysical properties. It would also be a significant advancement to provide a technique for enhancing a conjugated ionic polymer's fluorescence and photophysics that does not require challenging synthetic efforts. Hence, a simple technique to enhance fluorescent ionic conjugated polymer's photophysical properties without the need to synthesize new chemical structures would be extremely desirable.

Such complexes and techniques for their formation are disclosed and claimed herein.

SUMMARY OF THE INVENTION

The present invention is drawn to novel ionic conjugated polymer complexes characterized by enhanced photophysical properties. The present invention includes a fluorescent polymer-surfactant complex with at least one improved photophysical property such as increased quantum efficiency, excitation wavelength independent emissions spectra, narrowed and red-shifted absorption spectra, or reduction of non-radiative fluorescent decay pathways. These improvements are accomplished by complexing a fluorescent ionic conjugated polymer with an effective amount of an oppositely charged surfactant in a polar solvent.

The polymer-surfactant complexes within the scope of the present invention that exhibit enhanced photophysical properties may be easily prepared. They are prepared by adding an effective amount of oppositely charged surfactant to a solution of fluorescent ionic conjugated polymer in polar solvent.

By way of example and not by limitation, the complexes within the scope of this invention may exhibit increased fluorescence quantum efficiency compared to the neat polymer with a ratio of surfactant molecule to monomer repeat unit of polymer of just 1:100. Fluorescence emissions are generally amplified with increased surfactant concentration up to the point of surfactant saturation.

The polymer-surfactant complexes within the scope of the present invention may exhibit many other improved photophysical properties; the properties and the degree of improvement may vary depending on the polymer and surfactant used to form the complex. These complexes may exhibit fluorescence quantum efficiency improvement by a factor ranging from 2 to 20, or more, when compared to the neat polymer. Complexes within the scope of the present invention may have emission spectra that are excitation wavelength independent. They may have absorption spectra that are narrowed and red-shifted when compared to the neat polymer. The fluorescence of the polymer-surfactant complexes may also be characterized by single exponential decay kinetics rather than the less stable, multi-exponential decay characteristic of neat polymers.

Persons having ordinary skill in the art will appreciate that the polymer-surfactant complexes within the scope of this invention are valuable due to their potential to exhibit increased stability, increased fluorescence intensity, and increased control over fluorescent emissions. The value of these complexes is further increased because they are easy to prepare. The preparation of polymer-surfactant complexes within the scope of the present invention is very flexible allowing them to be used in a variety of applications.

One may prepare complexes within the scope of the present invention by adding an effective amount of surfactant to a solution of fluorescent ionic conjugated polymer. The surfactant and polymer solution concentrations can be varied to achieve desired photophysical properties. Typically, one polymer is complexed with one surfactant, but mixtures of multiple polymers and multiple surfactants may be used. Polymer-surfactant complexes of the present invention are commonly prepared in a polar solvent or mixture of solvents, though they may be prepared in any inert solvent chemically compatible with the ionic polymer and surfactant.

One may prepare complexes within the scope of the present invention by adding a sufficient amount of surfactant to a polymer solution to create a polymer-surfactant complex precipitate. Polymer-surfactant complex precipitates exhibit one or more of the improved photophysical properties discussed above. They are useful in a number of solid-state forms, primarily as thin films.

Additional features of the invention will be set forth in the description which follows, and in part will be apparent from the description, or may be learned by the practice of the invention. The features of the invention may be realized and obtained by means of the instruments and combinations particularly pointed out in the appended claims. These and other features of the present invention will become more fully apparent from the following description and appended claims, or may be learned by the practice of the invention as set forth hereinafter.

DETAILED DESCRIPTION OF THE PREFERRED EMBODIMENTS

The present invention is based on the discovery that combining fluorescent ionic conjugated polymers with oppositely charged surfactants produces a complex with at least one enhanced photophysical property. Fluorescent polymers are used in many applications, and they have become very important in medical and biological research. Applications for fluorescent polymers demand high stability, tunability, and high fluorescence efficiencies. The present invention discloses complexes that provide these features and methods for producing the complexes.

Fluorescent ionic conjugated polymers combined with oppositely charged surfactants form a complex described herein as a polymer-surfactant complex. These complexes may be formed in solution with the solution typically including one or more inert polar solvents. The ionic conjugated polymer and the surfactant are preferably soluble in and chemically compatible with the solvent. Though a surfactant is commonly added to a polymer solution, a polymer may be added to a surfactant solution. Water is a presently preferred solvent. Other polar solvents may also be used, including, but not limited to tetrahydrofuran (THF), dioxane, N, N-dimethylformamide (DMF), N, N,-dimethylacetamide (DMAC), N-methylpyrrolidone (NMP), dimethylsulfoxide (DMSO), u acetone, or a lower alkyl alcohol ($C_1$ to $C_4$). Mixtures of solvents may be used.

The polymer used to form the polymer-surfactant complex may be any ionic conjugated polymer or polyelectrolyte having fluorescent properties. Many ionic conjugated polymers have fluorescent properties, including, but not limited to, substituted and unsubstituted forms of poly(phenylene vinylene), poly(silyl-phenylene vinylene), poly(thienylene vinylene), poly(naphthalene vinylene), poly(quinoline vinylene), poly(pyridine vinylene), poly(fluorene), poly (thiophene), and derivatives thereof. The polymer will typically have an ionic side chain or ionic moieties that interact with the oppositely charged surfactant.

The surfactant used in the present invention may be any oppositely charged surfactant. Surfactants with an alkyl chain length ranging from about 8 to about 16 carbons may be effective. Surfactants with an alkyl chain length of less than about 8 carbons produce smaller effects on the photophysical properties than do surfactants that have between 8 and 16 carbons. Also, surfactants with chain lengths longer than about 18 carbons produce smaller effects than do surfactants with an alkyl chain length between 8 and 16 carbons.

Without being bound by theory, it is currently believed that surfactants with alkyl chains of less than 8 carbons are less effective due to their shorter chain length and decreased ability to interact along the length of the polymer backbone. Surfactants with chain lengths longer than 18 carbons produce complexes, but the improvement of the photophysical properties diminishes with increasing chain lengths.

The surfactant chain length affects its solubility and its critical micelle concentration in the solvent. As the surfactant alkyl chain length increases, the surfactant solubility and its critical micelle concentration both decrease. This trend creates an upper limit to the chain length of effective surfactants. Surfactants with chain lengths longer than 18 carbons are often not very soluble in polar solvents, and the surfactant that dissolves usually forms micelles. Currently, an effective range of surfactant alkyl chain length is between about 8 and about 16 carbons, and more preferably between about 10 and about 14 carbons. Complexes may be formed using surfactants outside of this range, and they are within the scope of this invention, but they may not exhibit the same degree of improvement in photophysical properties. Dodecyltrimethylammonium bromide is a presently preferred surfactant. Other oppositely charged surfactants may also be used.

Polymer-surfactant complexes formed according to the present invention are characterized by at least one enhanced photophysical property. Polymer-surfactant complexes within the scope of this invention may exhibit many improvements when compared to the neat polymer. Although each of the complexes of this invention may not exhibit the same improvement in all of the properties discussed herein, at least one photophysical property will be enhanced.

One of the possible improvements is an increase in fluorescence quantum efficiency. Neat fluorescent ionic conjugated polymers often exhibit quantum efficiencies of less than 10%. Upon addition of a surfactant, the new polymer-surfactant complex may have quantum efficiencies as high as 90%. In one example, a 20-fold increase in the fluorescence quantum efficiency was observed. The quantum efficiency may be improved by a factor ranging from 2 to 20, or more, depending on the choice of polymer and surfactant. This dramatic increase in quantum efficiency creates the potential for improvements in many of the fields in which fluorescence is used.

Figure 1:
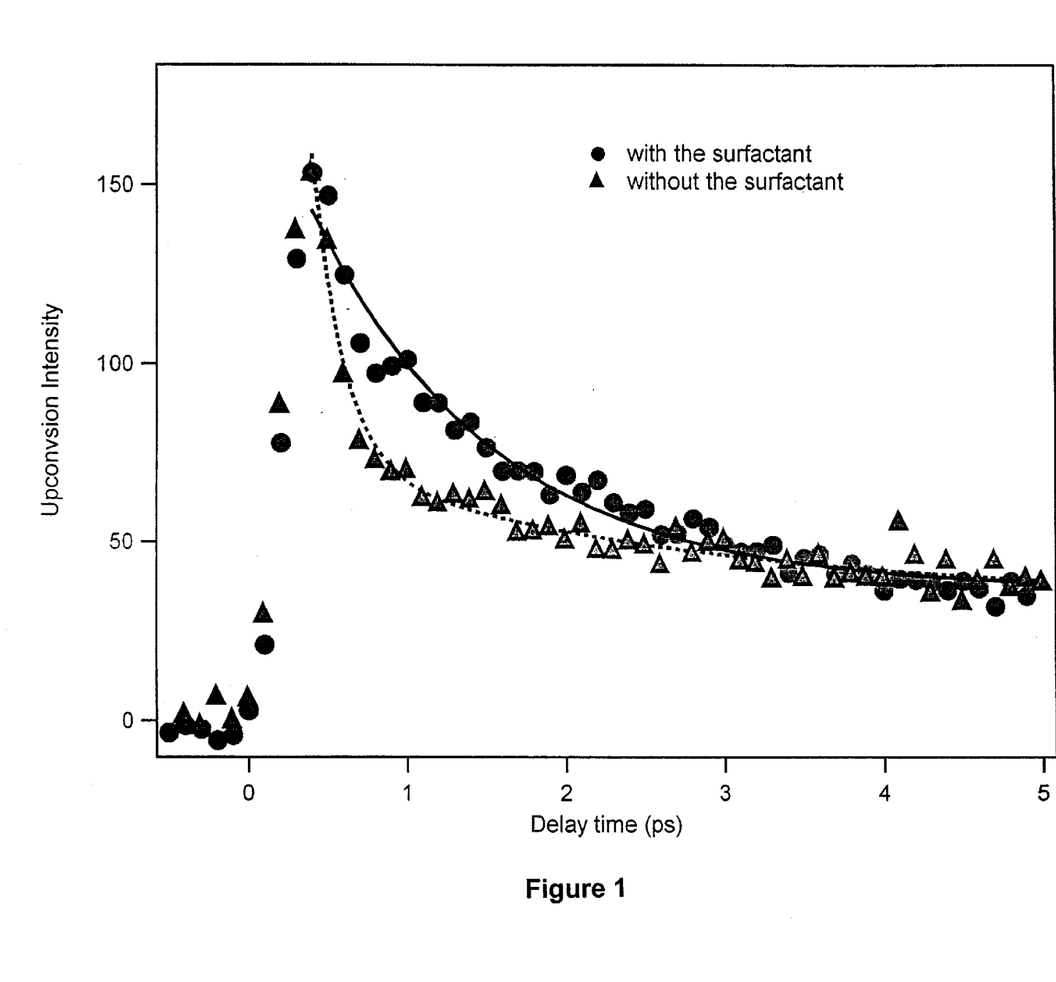
FIG. 1 is a graph illustrating the fluorescence decay dynamics of MPS-PPV ($5\times10^{-3}$ M) without surfactant ( ) and with surfactant DTA ($5\times10^{-4}$ M) (•). The dash curve is the fit of double exponential decay without the presence of surfactant; the solid line is the fit of single exponential decay with the presence of DTA.

Another possible improvement in the photophysical properties is a change in the fluorescence decay kinetics as shown in FIG. 1. Fluorescence decay kinetics describes the manner in which the fluorescence dims when it is no longer being excited. The fluorescence decay of most neat ionic conjugated polymers is described by multiple exponential decay kinetics, which means the fluorescence is unstable and dims quickly. The multiple exponential decay occurs because the fluorescence decay follows multiple pathways. Two common decay pathways are radiative decay and interchain reaction decay, such as charge transfer and excimer formation reactions. The interchain reaction decay pathways are undesirable and known to be caused by conformational disorder and chain folding.

Figure 2:
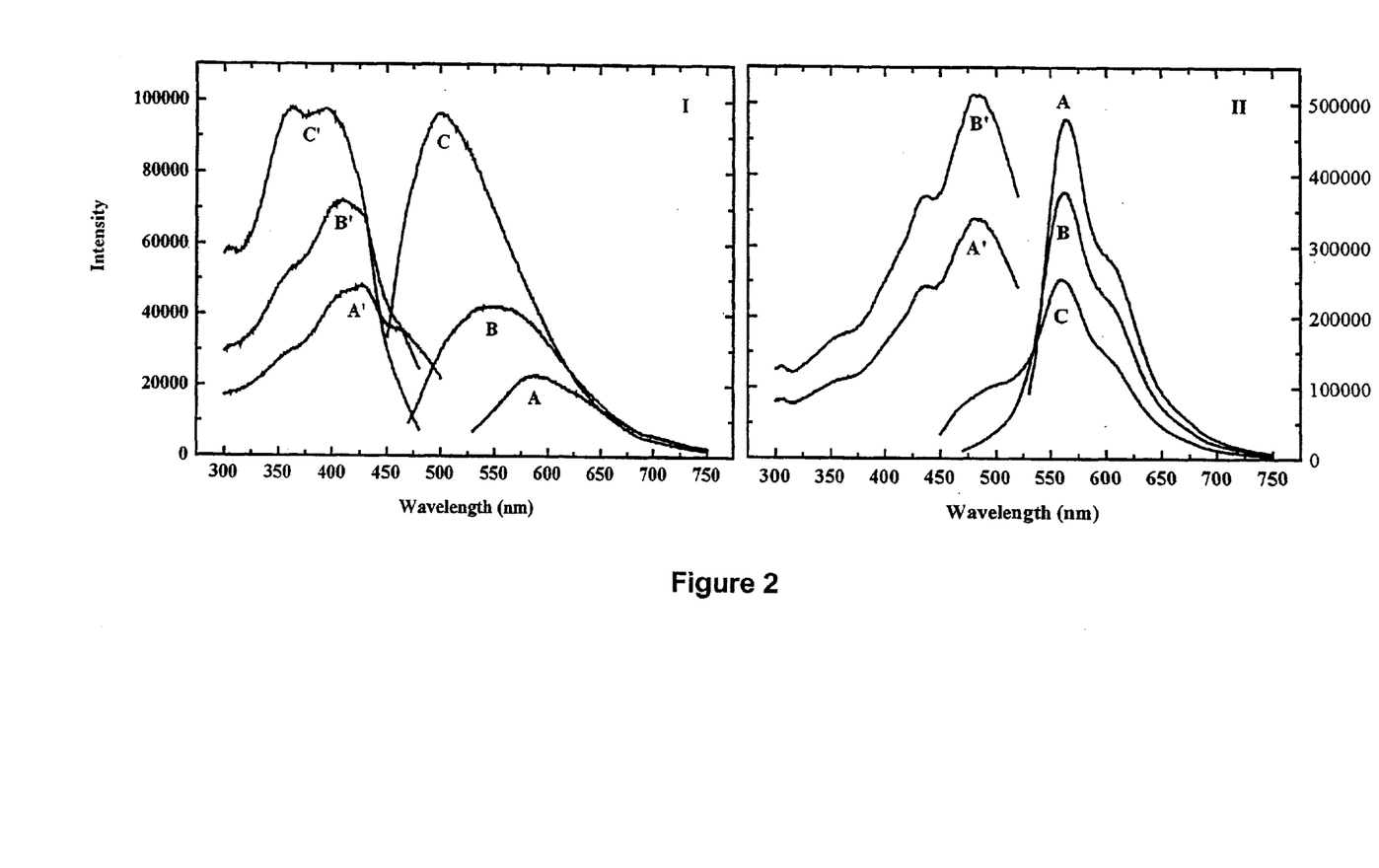
FIG. 2 is a graph illustrating the emission and excitation spectra of MPS-PPV in water ([MPS-PPV]=$2.2\times10^{-5}$ M). I: MPS-PPV alone; II: in the presence of $6\times10^{-6}$ M DTA. A: excited at 400 nm; B: excited at 450 nm; C: excited at 500 nm; A': monitor at 589 nm; B': monitor at 550 nm; C': monitor at 500 nm.

The polymer-surfactant complexes within the scope of this invention, however, are described by single exponential decay kinetics, a more stable dimming process. Without being bound by theory, it is currently believed that the change in decay kinetics is due to increased dominance of radiative decay pathways and elimination of many undesired decay pathways. A change in the fluorescence decay kinetics is evidence of a change in the polymer's chemical properties Another enhanced photophysical property that may be observed in polymer-surfactant complexes within the scope of this invention is emission spectra that are excitation wavelength independent. In neat polymers, the excited polymer often fluoresces at different wavelengths depending on the excitation wavelength, as shown in FIG. 2-I. However, polymer-surfactant complexes within the scope of the present invention have emission spectra that are independent of excitation wavelength, as shown in FIG. 2-II.

Figure 3:
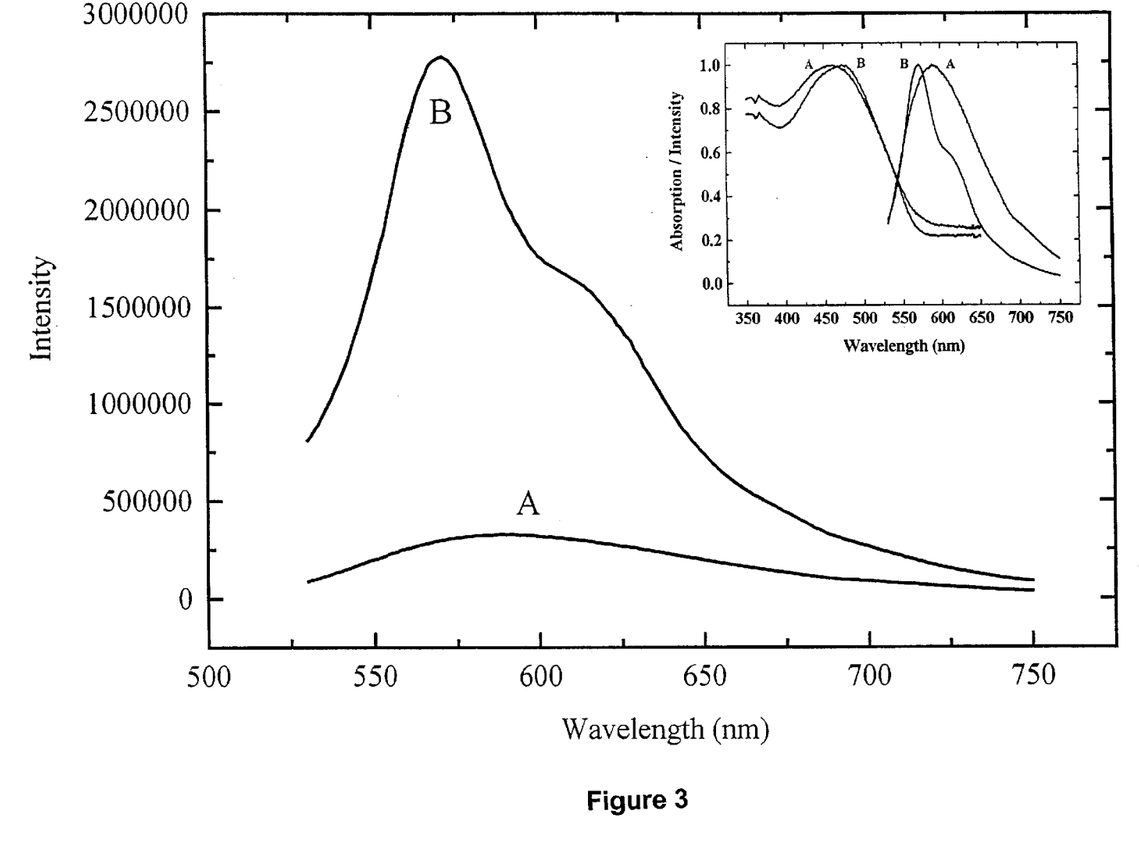
FIG. 3 is a graph illustrating the emission spectra of MPS-PPV in water ([MPS-PPV]$2\times10^{-5}$ M). Inset: normalized absorption and emission spectra of MPS-PPV in water. A: MPS-PPV alone; B: in the presence of $2\times10^{-6}$ M DTA.

The absorption spectra of fluorescent ionic conjugated polymers may also be modified upon addition of the surfactant. The adsorption spectra of polymer-surfactant complexes may be red-shifted and narrowed when compared to the spectra for the neat polymer, as shown in the inset of FIG. 3.

According to prior art methods, these changes in photophysical properties are obtained by synthesizing a new polymer with different properties. According to the present invention, the photophysical properties of the neat polymer may be altered without complicated synthesis efforts by mixing an oppositely charged surfactant and a fluorescent ionic conjugated polymer to form a polymer-surfactant complex. Modification of polymers according to the present invention occurs on the supermolecular level rather than at the level of the monomer repeat unit, allowing for easy modification. The present invention is distinguished from previous methods by the ease with which the fluorescent ionic conjugated polymers can be modified to have different photophysical properties.

Many factors can affect the properties of the resulting complex including the ionic conjugated polymer used, the oppositely charged surfactant used, the concentrations of each, and the ratio of surfactant molecules to monomer repeat unit of polymer. Each of these factors will be discussed below.

Complex formation is driven by Columbic forces between the ionic regions of the polymer and surfactant and by favorable entropy changes resulting from the release of interfacial solvent molecules when the complex is formed. The polymer and surfactant used may be selected from those described above to maximize these driving forces, which may lead to better complex formation and greater improvements in the photophysical properties.

One method of producing a polymer-surfactant complex according to the present invention comprises mixing a fluorescent ionic conjugated polymer and an oppositely charged surfactant in a polar solvent. The solution may comprise a plurality of polymers, a plurality of surfactants, or a plurality of polymers and surfactants.

Other than varying the polymer and the surfactant that form the complex, it is also possible to vary the concentrations of each and the ratio of these concentrations. The concentration of surfactant has no apparent lower limit as evidenced by the dramatic enhancement in fluorescence quantum efficiency with surfactant concentrations as low as $2.0 \times 10^{-6}$ M. However, there is an upper limit on the surfactant concentration determined by the solubility of the particular surfactant in the solvent selected. Surfactants in solution also have a critical micelle concentration (CMC) at which the surfactants tend to form micelles. The concentration of a given surfactant in solution should be below its CMC to preferentially complex with the ionic conjugated polymer, rather than form micelles. Polymer-surfactant complexes may be formed with surfactant concentrations above the CMC, and they are included within the scope of the present invention, but the enhancement of the photophysical properties may not be as great. In addition, high surfactant concentrations may cause precipitation of the complex.

The ionic conjugated polymer concentration in solution is limited by its solubility in the solvent. When selecting the polymer concentration, the desired ratio of surfactant molecules to monomer repeat units of polymer may be considered.

The ratio of surfactant molecules to monomer repeat units of polymer affects the enhancement of the photophysical properties. Complexes with a ratio ranging from about 1:100 to about 1:1 are currently preferred, although ratios outside of this range are also within the scope of this invention. The ratio of surfactant molecules to monomer repeat units is best understood by recognizing that each polymer molecule is made of many repeating monomer units joined together to create the polymer. The number of repeat units in a polymer is determined through methods known in the art. With that information, one skilled in the art may determine the concentration of monomer repeat units of polymer in the solution. The ratio of surfactant molecules to monomer repeat units is a comparison of the concentration of surfactant molecules to the concentration of monomer repeat units of polymer. This ratio is described herein as the surfactant-:monomer repeat unit ratio.

Amplification of the fluorescence emissions, or quantum efficiencies, of polymer-surfactant complexes within the scope of the present invention may be readily noticeable at a surfactant:monomer repeat unit ratio of just 1:100, suggesting that a minimal amount of surfactant can produce great changes in the properties of ionic conjugated polymers. The fluorescence emissions are further amplified as the ratio is increased, until the amplification effect saturates at a ratio of about 1:3, surfactant:monomer repeat unit.

Although the amplification effect is saturated at a ratio of about 1:3, a solid precipitate begins to form as the surfactant:monomer repeat unit ratio approaches about 1:1. This precipitate is recoverable through methods known in the art, such as centrifuge and filtration, and can be used in a variety of applications. The solid is convertible into thin films through methods known in the art such as casting or coating.

Figure 4:
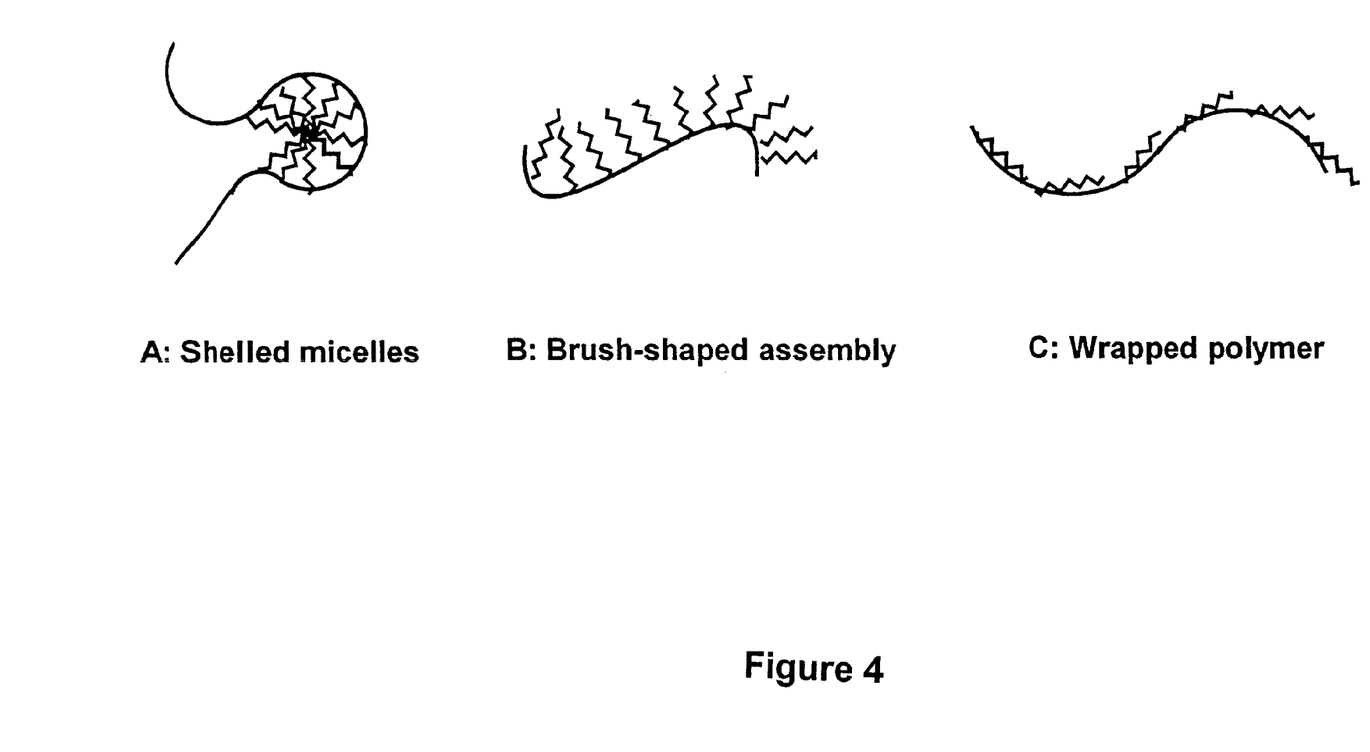
FIG. 4 illustrates proposed complex conformations between the polymer and the surfactant.

The complexes within the scope of this invention may form various structures such as encapsulated, or "shelled" micelles (consisting of clusters of surfactant molecules surrounded by the polymer backbone), or as a "brush-shaped" assembly (in which the hydrophobic surfactant chains are pendant to the polymer backbone as side chains) (see FIG. 4A and 4B). However, without being bound by theory, it is believed that a "wrapped polymer" configuration (FIG. 4C) is most likely, in which surfactant molecules are associated with the polymer along the backbone. This type of interaction extends the polymer chains, thereby inhibiting polymer chain folding, reducing the conformational disorder, and increasing the quantum efficiency. The more ordered and homogeneous polymer conformation in the polymer-surfactant complex may help explain the improvements to the photophysical properties that have been discussed above.

The photophysical properties of ionic conjugated polymers are dramatically enhanced with small amounts of oppositely charged surfactant, providing further evidence of a "wrapped" polymer configuration. Even at a surfactant-:monomer ratio as low as 1:100, noticeable fluorescence emission enhancement may be detected for complexes within the scope of the present invention. The marked change in the polymer's photophysical properties at such low concentrations suggests that the surfactant chains are oriented along the polymer backbone to maximize their interaction (FIG. 4c).

The saturation of the amplification effect at a surfactant-:monomer ratio of about 1:3, described above, provides further support for the wrapped polymer configuration. A surfactant:monomer ratio of about 1:3 is also approximately the ratio for which adjacent surfactant chains lying parallel to the polymer would be expected to overlap, assuming uniform coverage of the polymer. Without being bound by theory, it is believed that the surfactant overlapping causes the saturation of the amplification effect.

Further evidence of the complex's wrapped polymer configuration comes from quenching studies between the complex and ionic charge acceptors such as methyl viologen ($MV^{2+}$). The quenching constants of neat polymers with different acceptors are known for many polymer/acceptor systems. Study of polymer-surfactant complexes' quenching behavior reveals that the quenching constant for complexes may be significantly reduced when compared to neat polymers. In one example, the quenching constant was reduced by more than two orders of magnitude by using a complex formed with a surfactant:monomer ratio of 1:10. This surfactant content was not sufficient to occupy such a substantial number of the binding sites available along the polymer backbone if the surfactant chains were oriented perpendicular to the polymer chain. The decrease in the quenching constant suggests that surfactant chains may lie along the polymer backbone to maximize the coverage area and hinder the association of ionic charge acceptors with the polymer. Without being bound by theory, it is currently believed that the minimal amount of surfactant necessary to produce dramatic changes in photophysical properties, the coincident overlapping of surfactant molecules and saturation of the amplification effect, and the reduction in the quenching constant, suggest that the complex exists in a wrapped polymer configuration.

EXAMPLES

The following examples show various aspects of the invention. They are intended to be illustrative and not to limit the scope of the invention as defined by the claims.

Example 1

MPS-PPV (2-methoxy-5-propyloxysulfonato phenylene vinylene), a water-soluble, fluorescent ionic conjugated polymer, was prepared. Because water-soluble sulfonate groups are linked to each monomer unit, the synthesis of MPS-PPV was carried out using the Gilch polymerization procedure. Gilch, H. G.; Wheelwright, W. L. J *Polym. Sci. Part A: Polym. Chem.* 1966, 4, 1337. The resulting MPS-PPV had a molecular weight of about $1-5\times10^5$, estimated from light scattering measurements, and about 1000 monomer repeat units per polymer chain. As shown in the inset of FIG. 3, the absorption spectrum of MPS-PPV was characterized by a broad band at 400–550 nm, which is typical for 2,5-dialkoxy substituted PPV polymers. As shown in FIG. 2-I, the emission and excitation spectra of MPS-PPV in water were strongly dependent on the excitation wavelength. An emission spectrum maximum was observed at 500 nm, when excited at 400 nm, while excitation at 500 nm resulted in an emission maximum of about 590 nm. A similar trend was observed in the corresponding excitation spectra, in which maxima were observed at 380 or 425 nm when monitored at 500 or 589 nm, respectively. The wavelength-dependent absorption, excitation, and emission spectra suggested that the polymer had a heterogeneous distribution of independent fluorescence emitters. In other words, the polymer chain was not uniform, and its disorder caused the conjugation length to vary greatly. The results of FIG. 2-I indicated a broad distribution of conjugation lengths for MPS-PPV in solution.

Example 2

Figure 5:
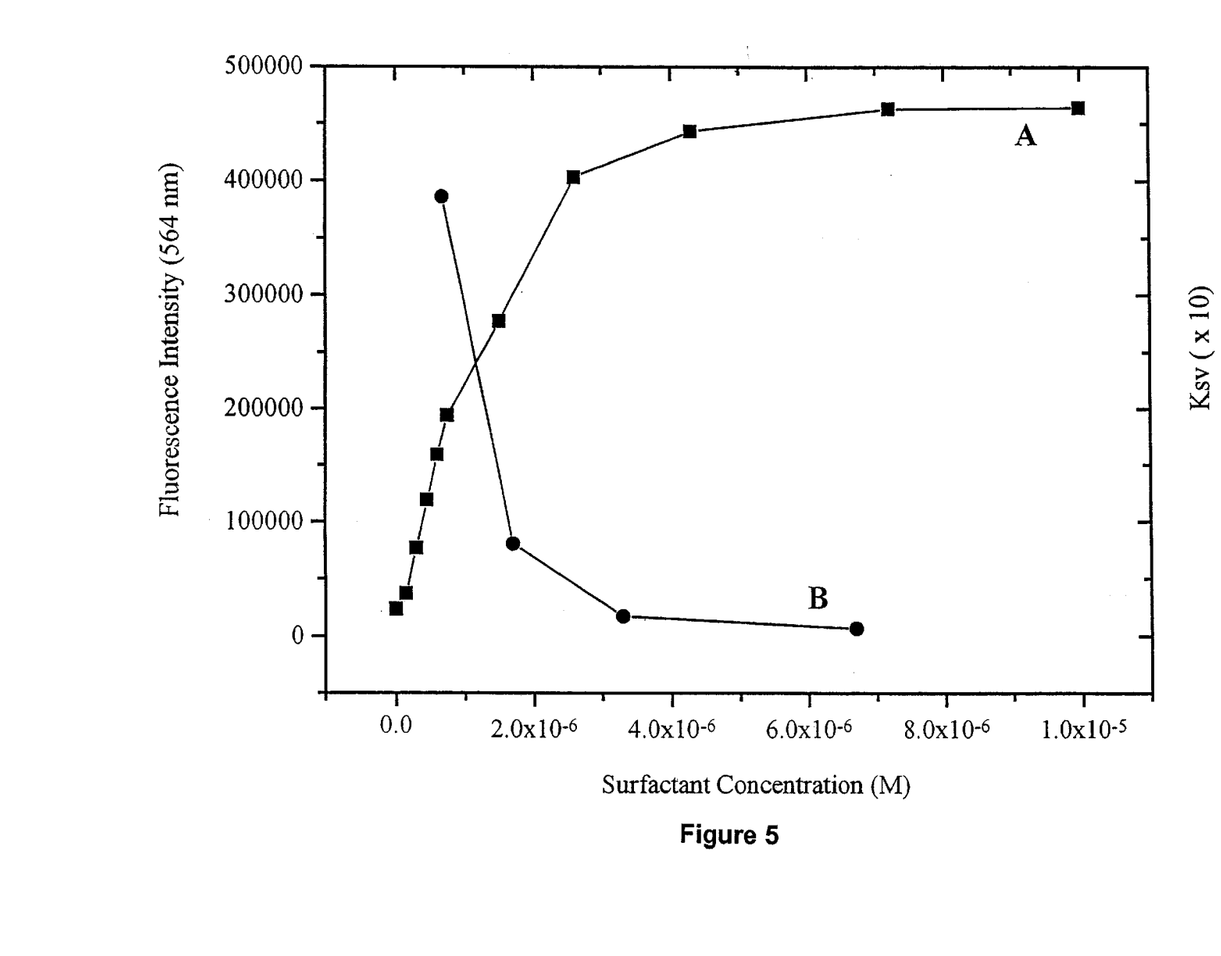
FIG. 5 is a graph illustrating the fluorescence intensity (excited at 500 nm and monitored at 564 nm) of MPS-PPV as a function of DTA concentration (A); and the quenching constant ($K_{sv}$) of methyl viologen ($MV^{2+}$) to MPS-PPV as a function of DTA concentration (B).

A polymer-surfactant complex was prepared by adding the cationic surfactant DTA (dodecyltrimethylammonium bromide) to an aqueous MPS-PPV polymer solution prepared according to Example 1. The polymer was dissolved in water to a concentration of $2.2\times10^{-5}$ M (monomer repeat units of polymer), and the surfactant was added to a concentration of $2\times10^{-6}$ M. The measured photophysical properties of the MPS-PPV/DTA complex changed dramatically when compared to the neat MPS-PPV. As shown in FIG. 3, the emission spectrum of the polymer-surfactant complex showed a well-defined vibrational structure with a maximum at 563 nm, while the absorption spectrum was narrowed and red-shifted (the inset to FIG. 3). More strikingly, the fluorescence of the polymer-surfactant complex was much stronger than that for the neat polymer solution. The polymer's fluorescence quantum efficiency was increased approximately 20 fold upon addition of the surfactant when excited at 500 nm (FIG. 5, curve A). Furthermore, the emission and excitation spectra were now wavelength-independent (FIG. 2-II). For excitation wavelengths ranging from 400–500 nm, the emissions spectrum maximum was at about 563 nm.

Example 3

An MPS-PPV/DTA complex was prepared in aqueous solution as in Example 2. The fluorescence was monitored over time to observe the decay kinetics and determine if there were changes in the polymer's electronic structure. Time-resolved photoluminescence (PL) of the polymer-surfactant complex in aqueous solution revealed that the fluorescence decay kinetics was described by single exponential decay with a lifetime of 1.2 ps, as shown in FIG. 1. This was different than the fluorescence behavior of the neat polymer solution, in which the fluorescence decay was dominated by double exponential decay with lifetimes of 0.2 and 2.4 ps, respectively. This suggested that non-radiative decay pathways in the polymer were reduced upon complex formation, and that radiative fluorescence decay was now the major pathway for excited state relaxation in the MPS-PPV/DTA complex.

Example 4

This example presents fluorescence quenching studies between methyl viologen ($MV^{2+}$) and a polymer-surfactant complex within the scope of the present invention. Methyl viologen ($MV^{2+}$) is known to quench the fluorescence of MPS-PPV with the MPS-PPV/$MV^{2+}$ system having a large quenching constant ($K_{sv}$~$2\times10^7$ $M^{-1}$). The large quenching constant is due to a combination of efficient complexation and charge transfer quenching between the polymer and $MV^{2+}$, followed by ultrafast exciton migration within the entire polymer chain. Quenching studies were also performed with an MPS-PPV/DTA/$MV^{2+}$ system. When the surfactant DTA was present in the polymer solution, $K_{sv}$ value of $MV^{2+}$ decreased rapidly as the ratio of surfactant:monomer was increased, as shown in curve B of FIG. 5. The $K_{sv}$ for MPS-PPV/$MV^{2+}$ was depressed by more than two orders of magnitude at a ratio of surfactant:monomer of 1:10. This ratio was not sufficient to occupy all of the binding sites available along the polymer backbone if the surfactant chains were oriented perpendicular to the polymer chain. The decrease of $K_{sv}$ for $MV^{2+}$ from $1.7\times10^7$ $M^{-1}$ in the neat polymer solution to $6.8\times10^4$ $M^{-1}$ in the surfactant-polymer complex (1:10) solution, strongly suggested that the surfactant chains might lie along the polymer backbone to maximize the coverage area, thereby acting to both extend the polymer backbone, and hinder association of $MV^{2+}$ with the polymer.

What is claimed is:

1. A fluorescent conjugated polymer-surfactant composition comprising:
   an ionic conjugated polymer having fluorescent properties, complexed with
   an oppositely charged surfactant, wherein the complex is characterized by at least one enhanced photophysical property.

2. A fluorescent conjugated polymer-surfactant composition according to claim 1, wherein the enhanced photophysical property is selected from an increased fluorescence quantum efficiency, an excitation wavelength independent fluorescence emission spectrum, a narrowed and red-shifted absorption spectrum, or fluorescence decay kinetics described by single exponential decay.

3. A fluorescent conjugated polymer-surfactant composition according to claim 1, wherein the surfactant comprises surfactant molecules having an average alkyl chain length ranging from about 8 to about 16 carbons.

4. A fluorescent conjugated polymer-surfactant composition according to claim 1, wherein the surfactant comprises surfactant molecules having an average alkyl chain length ranging from about 10 to about 14 carbons.

5. A fluorescent conjugated polymer-surfactant composition according to claim 1, wherein the surfactant comprises dodecyltrimethylammonium bromide.

6. A fluorescent conjugated polymer-surfactant composition according to claim 1, wherein the polymer comprises at least one fluorescent ionic conjugated polymer selected from substituted and unsubstituted forms of poly(phenylene vinylene), poly(silyl-phenylene vinylene), poly(thienylene vinylene), poly(naphthalene vinylene), poly(quinoline vinylene), poly(pyridine vinylene), poly(fluorene), poly(thiophene), or derivatives thereof.

7. A fluorescent conjugated polymer-surfactant composition according to claim 1, wherein the ratio of surfactant molecules per monomer repeat unit of polymer is at least 1:100.

8. A fluorescent conjugated polymer-surfactant composition according to claim 1, wherein the ratio of surfactant molecules per monomer repeat unit of polymer is at least 1:1.

9. A fluorescent conjugated polymer-surfactant composition according to claim 1, wherein the ratio of surfactant molecules per monomer repeat unit of polymer is at least 1:3.

10. A fluorescent conjugated polymer-surfactant composition according to claim 1, wherein the ratio of surfactant molecules per monomer repeat unit of polymer is at least 1:1.

11. A fluorescent conjugated polymer-surfactant composition comprising:
    an ionic conjugated polymer having fluorescent properties, complexed with
    an oppositely charged surfactant comprising surfactant molecules having an average alkyl chain length ranging from about 8 to about 16 carbons,
    wherein the ratio of surfactant molecules per monomer repeat unit of polymer ranges from about 1:100 to about 1:1, and
    wherein the complex is characterized by at least one enhanced photophysical property.

12. A fluorescent conjugated polymer-surfactant composition according to claim 11, wherein the enhanced photophysical property is selected from an increased fluorescence quantum efficiency, an excitation wavelength independent fluorescence emission spectrum, a narrowed and red-shifted absorption spectrum, or fluorescence decay kinetics described by single exponential decay.

13. A fluorescent conjugated polymer-surfactant composition according to claim 12, wherein the polymer comprises at least one fluorescent ionic conjugated polymer selected from substituted and unsubstituted forms of poly(phenylene vinylene), poly(silyl-phenylene vinylene), poly(thienylene vinylene), poly(naphthalene vinylene), poly(quinoline vinylene), poly(pyridine vinylene), poly(fluorene), poly(thiophene), or derivatives thereof.

14. A fluorescent conjugated polymer-surfactant composition according to claim 12, wherein the surfactant comprises surfactant molecules having an average alkyl chain length ranging from about 10 to about 14 carbons.

15. A fluorescent conjugated polymer-surfactant composition according to claim 14, wherein the polymer comprises at least one fluorescent ionic conjugated polymer selected from substituted and unsubstituted forms of poly(phenylene vinylene), poly(silyl-phenylene vinylene), poly(thienylene vinylene), poly(naphthalene vinylene), poly(quinoline vinylene), poly(pyridine vinylene), poly(fluorene), poly(thiophene), or derivatives thereof.

16. A fluorescent conjugated polymer-surfactant composition comprising:
    an ionic conjugated polymer comprising 2-methoxy-5-propyloxysulfonato phenylene vinylene having fluorescent properties, complexed with
    an oppositely charged surfactant comprising dodecyltrimethylammonium bromide,
    wherein the ratio of surfactant molecules per monomer repeat unit of polymer ranges from about 1:100 to about 1:1, and
    wherein the complex is characterized by the enhancement of at least one photophysical property selected from a fluorescence quantum efficiency increase ranging from 5 to 20 fold, an excitation wavelength independent fluorescence emission spectrum, a narrowed and red-shifted absorption spectrum, or fluorescence decay kinetics described by single exponential decay.

17. A method of preparing a fluorescent conjugated polymer-surfactant composition comprising:

obtaining a solution comprising an ionic conjugated polymer having fluorescent properties in polar solvent;

adding an effective amount of oppositely charged surfactant to the polymer solution to form a polymer-surfactant complex in solution, wherein said complex exhibits at least one enhanced photophysical property compared to the neat polymer.

18. A method of preparing a fluorescent conjugated polymer-surfactant composition according to claim 17, wherein the surfactant comprises surfactant molecules having an average alkyl chain length ranging from about 8 to about 16 carbons.

19. A method of preparing a fluorescent conjugated polymer-surfactant composition according to claim 17, wherein the surfactant comprises surfactant molecules having an average alkyl chain length ranging from about 10 to about 14 carbons.

20. A method of preparing a fluorescent conjugated polymer-surfactant composition according to claim 17, wherein the surfactant comprises dodecyltrimethylammonium bromide.

21. A method of preparing a fluorescent conjugated polymer-surfactant composition according to claim 17, wherein the effective amount of surfactant produces a ratio of surfactant molecules per monomer repeat unit of polymer of at least 1:100.

22. A method of preparing a fluorescent conjugated polymer-surfactant composition according to claim 17, wherein the effective amount of surfactant produces a ratio of surfactant molecules per monomer repeat unit of polymer of at least 1:10.

23. A method of preparing a fluorescent conjugated polymer-surfactant composition according to claim 17, wherein the effective amount of surfactant produces a ratio of surfactant molecules per monomer repeat unit of polymer of at least 1:3.

24. A method of preparing a fluorescent conjugated polymer-surfactant composition according to claim 17, wherein the effective amount of surfactant produces a ratio of surfactant molecules per monomer repeat unit of polymer of at least 1:1.

25. A method of preparing a fluorescent conjugated polymer-surfactant composition according to claim 17, wherein the effective amount of surfactant produces a solid precipitate.

26. A method of preparing a fluorescent conjugated polymer-surfactant composition according to claim 17, wherein the polymer comprises at least one fluorescent ionic conjugated polymer selected from substituted and unsubstituted forms of poly(phenylene vinylene), poly(silylphenylene vinylene), poly(thienylene vinylene), poly(naphthalene vinylene), poly(quinoline vinylene), poly(pyridine vinylene), poly(fluorene), poly(thiophene), or derivatives thereof.

27. A method of preparing a fluorescent conjugated polymer-surfactant composition according to claim 17, wherein the polymer comprises 2-methoxy-5-propyloxysulfonato phenylene vinylene.

28. A method of preparing a fluorescent conjugated polymer-surfactant composition according to claim 25, further comprising the step of recovering the solid precipitate.

29. A method of preparing a fluorescent conjugated polymer-surfactant composition according to claim 28, further comprising the steps of:

dissolving the recovered precipitate in organic solvent; and coating the precipitate on a substrate to form a thin film of polymer-surfactant complex.

30. A method of preparing a fluorescent conjugated polymer-surfactant composition according to claim 29, wherein the precipitate is coated via spin coating methods.

31. A method of preparing a fluorescent conjugated polymer-surfactant composition according to claim 29, wherein the precipitate is coated via casting methods.

32. A method of preparing a fluorescent conjugated polymer-surfactant composition comprising the steps of:

obtaining a solution comprising an ionic conjugated polymer having fluorescent properties in polar solvent;

adding an effective amount of oppositely charged surfactant to the polymer solution to form a polymer-surfactant complex in solution, wherein the surfactant comprises surfactant molecules having an average alkyl chain length ranging from about 8 to about 16 carbons, wherein the effective amount of surfactant produces a ratio of surfactant molecules per monomer repeat unit of polymer ranging from about 1:100 to about 1:1, and wherein said complex exhibits at least one enhanced photophysical property compared to the neat polymer.

33. A method of preparing a fluorescent conjugated polymer-surfactant composition according to claim 32, wherein the polymer comprises at least one fluorescent ionic conjugated polymer selected from substituted and unsubstituted forms of poly(phenylene vinylene), poly(silylphenylene vinylene), poly(thienylene vinylene), poly(naphthalene vinylene), poly(quinoline vinylene), poly(pyridine vinylene), poly(fluorene), poly(thiophene), or derivatives thereof.

34. A method of preparing a fluorescent conjugated polymer-surfactant composition according to claim 32, wherein the surfactant comprises surfactant molecules having an average alkyl chain length ranging from about 10 to about 14 carbons.

35. A method of preparing a fluorescent conjugated polymer-surfactant composition according to claim 34, wherein the polymer comprises at least one fluorescent ionic conjugated polymer selected from substituted and unsubstituted forms of poly(phenylene vinylene), poly(silylphenylene vinylene), poly(thienylene vinylene), poly(naphthalene vinylene), poly(quinoline vinylene), poly(pyridine vinylene), poly(fluorene), poly(thiophene), or a derivative thereof.

36. A method of preparing a fluorescent conjugated polymer-surfactant composition comprising the acts of:

obtaining a solution comprising an ionic conjugated polymer comprising 2-methoxy-5-propyloxysulfonato phenylene vinylene having fluorescent properties in polar solvent;

adding an effective amount of oppositely charged surfactant comprising dodecyltrimethylammonium bromide to the polymer solution to form the polymer-surfactant composition in solution, wherein the effective amount of surfactant produces a ratio of surfactant molecules per monomer repeat unit of polymer ranging from about 1:100 to about 1:1, and wherein said composition exhibits at least one enhanced photophysical property compared to the neat polymer.

* * * * *